(12) United States Patent
Beisele et al.

(10) Patent No.: US 10,851,201 B2
(45) Date of Patent: Dec. 1, 2020

(54) CURING AGENT FOR THERMOSETTING EPOXY RESINS, AND A PROCESS FOR THE PREPARATION OF INSULATION SYSTEMS FOR ELECTRICAL ENGINEERING

(71) Applicant: Huntsman International LLC, The Woodlands, TX (US)

(72) Inventors: Christian Beisele, Muellheim (DE); Sophie Colliard, Uffheim (FR); Catherine Schoenenberger, Sierentz (FR)

(73) Assignee: HUNTSMAN INTERNATIONAL LLC, The Woodlands, TX (US)

(*) Notice: Subject to any disclaimer, the term of this patent is extended or adjusted under 35 U.S.C. 154(b) by 45 days.

(21) Appl. No.: 15/575,270

(22) PCT Filed: May 11, 2016

(86) PCT No.: PCT/EP2016/060558
§ 371 (c)(1),
(2) Date: Nov. 17, 2017

(87) PCT Pub. No.: WO2016/184749
PCT Pub. Date: Nov. 24, 2016

(65) Prior Publication Data
US 2018/0142058 A1 May 24, 2018

(30) Foreign Application Priority Data
May 19, 2015 (EP) ...................................... 15168065

(51) Int. Cl.
*C08G 59/50* (2006.01)
*C08G 59/62* (2006.01)
(Continued)

(52) U.S. Cl.
CPC ......... *C08G 59/5033* (2013.01); *C08G 59/18* (2013.01); *C08G 59/5073* (2013.01); *C08G 59/56* (2013.01); *C08G 59/621* (2013.01)

(58) Field of Classification Search
None
See application file for complete search history.

(56) References Cited

U.S. PATENT DOCUMENTS 4,775,736 A 10/1988 Wiggins
5,364,977 A * 11/1994 Asai .................... C07C 39/15
568/717
(Continued)

FOREIGN PATENT DOCUMENTS

CN 102875470 A 1/2013
EP 0949286 A1 10/1999
(Continued)

OTHER PUBLICATIONS

International Search Report and the Written Opinion of the International Searching Authority dated Jul. 20, 2016, for International Application PCT/EP2016/060558 filed May 11, 2016, 9 pages.
(Continued)

*Primary Examiner* — Megan McCulley
(74) *Attorney, Agent, or Firm* — Huntsman International LLC; Lewis D. Craft

(57) ABSTRACT

The invention relates to a curing agent for thermosetting epoxy resins comprising (a) at least one aromatic amine containing at least two amino groups, and (b) at least one clathrate compound obtained by reacting a tetrakisphenol of the formula (1), or a 9,9-Bis(4-hydroxyphenyl)fluorene of formula (2), as the host molecule, and an imidazole or an imidazolium derivative as the guest molecule, wherein the substituents are as defined in the description, and n is the number 0, 1, 2 or 3, which can advantageously be used for the curing of epoxy resins. In addition, the invention also relates to a process for the preparation of a cured article, a process for the preparation of insulation systems for electrical engineering and a cured article obtained by the processes.

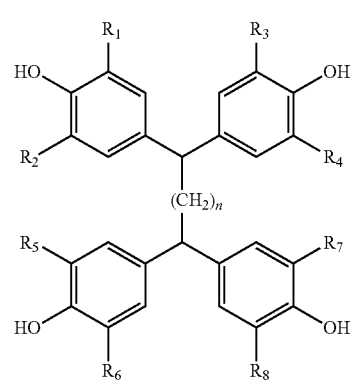

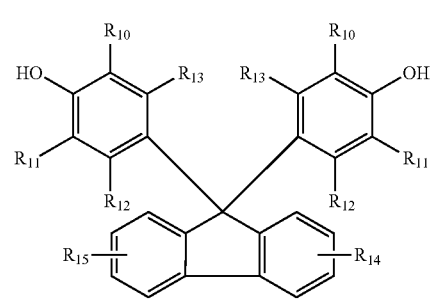

12 Claims, No Drawings

(51) Int. Cl.
*C08G 59/56* (2006.01)
*C08G 59/18* (2006.01)

(56) References Cited

U.S. PATENT DOCUMENTS

| | | | | |
|---|---|---|---|---|
| 6,147,169 | A * | 11/2000 | Ohnishi | C08G 59/18 525/403 |
| 6,727,325 | B1 * | 4/2004 | Suzuki | C08G 59/18 525/481 |
| 2004/0106764 | A1 * | 6/2004 | Suzuki | C08G 59/18 528/98 |
| 2006/0287465 | A1 * | 12/2006 | Suzuki | C08G 59/621 528/98 |
| 2008/0233438 | A1 * | 9/2008 | Yagi | C10L 3/108 429/476 |
| 2010/0179250 | A1 * | 7/2010 | Ono | C08G 59/4014 523/455 |
| 2012/0004349 | A1 | 1/2012 | Kaneko et al. | |
| 2012/0196991 | A1 * | 8/2012 | Ono | C08G 59/4014 525/529 |
| 2013/0059942 | A1 | 3/2013 | Ono et al. | |
| 2014/0205843 | A1 | 7/2014 | Beisele | |
| 2016/0017088 | A1 * | 1/2016 | Ono | C07C 211/27 564/373 |
| 2018/0142058 | A1 * | 5/2018 | Beisele | C08G 59/18 |

FOREIGN PATENT DOCUMENTS

| | | |
|---|---|---|
| JP | 2007039449 A | 2/2007 |
| JP | 2009234998 A | 10/2009 |
| JP | 2012232994 A | 11/2012 |
| JP | 2013136702 A | 7/2013 |

OTHER PUBLICATIONS

Database WPI, Week 201348, Thomson Scientific, GB, AN 2013-L72244, XP002754798, corresponds to JP2013136702.
Database WPI, Week 200974, Thomson Scientific, GB, AN 2009-P75621, XP002759706, corresponds to JP2009234998.
English abstract of Japanese publication No. 2009234998, publication date Oct. 15, 2009, 1 page.
Computer English translation of Japanese publication No. 2013136702, publication date Nov. 7, 2013, 16 pages.
English abstract of Japanese publication No. 2007039449, publication date Feb. 15, 2007, 1 page.
English abstract of Japanese publication No. 2012232994, publication date Nov. 29, 2012, 1 page.

* cited by examiner

CURING AGENT FOR THERMOSETTING EPOXY RESINS, AND A PROCESS FOR THE PREPARATION OF INSULATION SYSTEMS FOR ELECTRICAL ENGINEERING

CROSS-REFERENCE TO RELATED APPLICATIONS

This application is the National Phase of International Application PCT/EP2016/060558 filed May 11, 2016 which designated the U.S. and which claims priority to application Ser. No. EP15168065.9 filed May 19, 2015. The noted applications are incorporated herein by reference.

FIELD OF INVENTION

The present invention relates to a curing agent for thermosetting epoxy resins, a multiple component thermosetting epoxy resin composition comprising the said curing agent, a process for the preparation of insulation systems for electrical engineering, wherein the epoxy resin composition is used, and the articles obtained by the said process. The thermosetting epoxy resin composition has a good pot life and a high reactivity. The insulation encased articles obtained are suitable for electrical applications, exhibit good mechanical, electrical and dielectrical properties and can be used as, for example, insulators, bushings, switchgears and instrument transformers.

BACKGROUND OF THE INVENTION

Epoxy resin compositions are commonly used for the preparation of insulation systems for electrical engineering. However, most of these epoxy resin compositions utilize anhydrides as curing agents. Due to the developing regulatory framework for chemicals, it is expected that the use of anhydrides in epoxy resins will be restricted in the near future, because of their R42 label (respiratory sensitizer). Therefore, some anhydrides are already on the SVHC candidate list (substances of very high concern) of the REACH regulation. It is likely that in some years these substances may no longer be used without special authorisation. As all known anhydrides are R42-labeled and even yet unknown anhydrides would be expected by toxicologists to be also R42-labeled, a solution that is free of anhydrides is desirable.

Amines as curing agents for epoxy resins are well known, in particular, for the preparation of composite materials. However, amine curing agents are often too reactive to be processable in electrical potting or encapsulation applications. As the mass of the epoxy resin composition to be processed increases, control of the exotherm becomes vital. The uncontrolled release of heat from the curing of the thermoset due to its mass may result in the degradation of the thermoset's mechanical properties, or even to thermal decomposition of the thermoset. Also degradation of the mechanical properties of the structural parts in contact with the thermoset is likely to occur. In particular in automatic pressure gelation process (APG), it is important to provide for a lower exothermic peak temperature to control the cure profile, i.e. gelation front within the mold. The cure profile of epoxy resin compositions is inappropriate and the exotherm is too high for application in APG, when amines are used as curing agents.

In order to cope with the problem of an inappropriate cure profile of epoxy resins containing amine curing agents, the use of aromatic amines/polyamines was suggested. However, several factors limit the practical utility of aromatic amines/polyamines in admixture with the epoxy resins, such as their toxicity, pot life, reactivity, and the physical properties which it imparts to the cured resin.

It is also known that the reactivity of aromatic amine/polyamine curing agents can be increased by the addition of an accelerator. However, the presence of an accelerator in an epoxy resin/aromatic diamine composition shortens the pot life to an extent, where the composition is no longer suitable for use in various applications.

Curing agent compositions for epoxy resins containing a sterically hindered aromatic diamine and a complex of boron trifluoride and a cycloaliphatic amine as an accelerator are suggested in U.S. Pat. No. 4,775,736. Hindered aromatic diamines are used instead of unhindered aromatic diamines, because of their lower toxicity. However, the compositions of the prior art still have some disadvantages with regard to the properties required, in particular, when the compositions are used in potting or casting applications for the preparation of insulation systems for electrical engineering which contain fillers.

Accordingly, there is still a need for new thermosetting, anhydride-free epoxy compositions which advantageously can be used in potting or encapsulation applications for manufacturing of electrical insulation systems, such as switchgear or transformer applications. The properties of the cured products shall be competitive with anhydride cured thermosets, such as long term aging, tracking resistance or arc resistance.

SUMMARY OF THE INVENTION

It is an object of the present invention to provide an anhydride-free curing agent for thermosetting epoxy resins along with a multiple component thermosetting epoxy resin composition comprising the said curing agent. The epoxy resin composition shall be R42-free and SVHC-free, and distinguished by a long pot life and a high reactivity at elevated processing temperatures. The epoxy resin composition shall be especially suitable for the preparation of insulation systems for electrical engineering, such as automatic pressure gelation (APG). It is desirable that the cure profile can be controlled in the desired manner. Still another object of the present invention is to provide the encased articles obtained from potting or encapsulation process which exhibit good mechanical, electrical and dielectrical properties, for example, as insulators, bushings, switchgears and instrument transformers in electrical engineering.

DETAILED DESCRIPTION OF THE INVENTION

Accordingly, the present invention relates to a curing agent for thermosetting epoxy resins comprising
(a) at least one aromatic amine containing at least two amino groups, and
(b) at least one clathrate compound obtained by reacting a tetrakisphenol of the formula

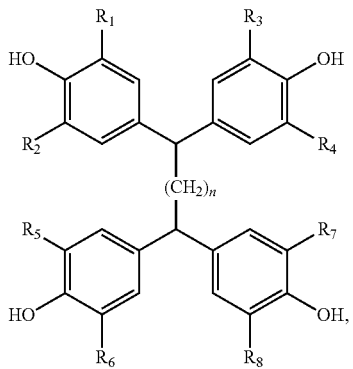

(1)

or
a 9,9-Bis(4-hydroxyphenyl)fluorene of formula

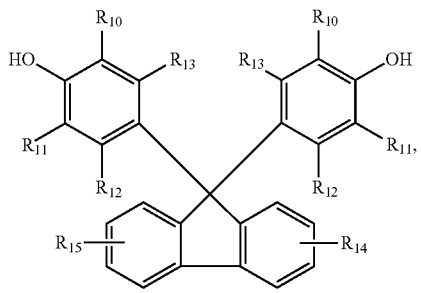

(2)

as the host molecule and an imidazole or an imidazolium derivative as the guest molecule, wherein, $R_1$, $R_2$, $R_3$, $R_4$, $R_5$, $R_6$, $R_7$, $R_8$, $R_{10}$, and $R_{11}$ are each independently of one another hydrogen, halogen, $C_1$-$C_4$alkyl, $C_1$-$C_4$alkoxy, or phenyl which is unsubstituted or substituted by $C_1$-$C_4$alkyl, $C_1$-$C_4$alkoxy or halogen, $R_{12}$, $R_{13}$, $R_{14}$ and $R_{15}$ are each independently of one another hydrogen, halogen, $C_1$-$C_4$alkyl or $C_1$-$C_4$alkoxy, and n is the number 0, 1, 2 or 3.

As the at least one aromatic amine (a) containing at least two amino groups all aromatic amines come into consideration, which contain, for example, two, three or four amino groups per molecule. Suitable aromatic amines for the curing of epoxy resins are known to the skilled person.

In one embodiment the aromatic amine (a) is an aromatic diamine and is, for example, selected from the group of o-phenylenediamine, m-phenylenediamine, p-phenylenediamine, diaminodiphenylmethane, diaminodiphenylsulfone, m-xylenediamine, 3,5-diethyl-2,4-diaminotoluene, 3,5-diethyl-2,6-diaminotoluene, 1,3,5-triethyl-2,4-diaminobenzene, 1-ethyl-3,5-diisopropyl-2,6-diaminobenzene, 1,3,4,6-tetramethyl-2,5-diaminobenzene, 1,4-dimethyl-3,6-diethyl-2,5-diaminobenzene, 4,4'-methylenebis(2,6-diisopropylaniline), 4,4'-methylenebis(2,6-diethylaniline), 4,4'-methylenebis(2-methyl-6-ethylaniline), 2,4,6-tri(methylthio)-1,3-diaminobenzene, 3,5-di(methylthio)-2,4-diaminotoluene, 3,5-di(ethylthio)-2,4-diaminotoluene, 3-methylthio-5-ethylthio-2,4-diaminotoluene, 3,5-di(methylthio)-2,6-diaminotoluene, 4,4'-diamino-3,3',5,5'-tetra(methylthio)biphenyl, 4,4'-ethylidenebis[2,6-di(methylthio)aniline], and 4,4'-methylenebis[2,6-di(ethylthio)aniline].

In a preferred embodiment the aromatic amine (a) is an aromatic diamine which is sterically hindered. Sterically hindered aromatic diamines bear in at least one position ortho to each amino group a substituent, usually a $C_1$-$C_4$alkyl, $C_1$-$C_4$alkoxy or $C_1$-$C_4$alkylthio group, for example, methyl, ethyl, n-propyl, isopropyl, n-butyl, sec-butyl, tert-butyl, isobutyl, methoxy, ethoxy, n-propoxy, isopropoxy, n-butoxy or isobutoxy, methylthio, ethylthio, n-propylthio, isopropylthio, n-butylthio or isobutylthio.

A hindered aromatic diamine useful in the practice of the present invention is, for example, selected from the group of 1,3,5-triethyl-2,4-diaminobenzene, 1-ethyl-3,5-diisopropyl-2,6-diaminobenzene, 1,3,4,6-tetramethyl-2,5-diaminobenzene, 1,4-dimethyl-3,6-diethyl-2,5-diaminobenzene, 4,4'-methylenebis(2,6-diisopropylaniline), 4,4'-methylenebis(2,6-diethylaniline), 4,4'-methylenebis(2-methyl-6-ethylaniline), 2,4,6-tri(methylthio)-1,3-diaminobenzene, 3,5-di(methylthio)-2,4-diaminotoluene, 3,5-di(ethylthio)-2,4-diaminotoluene, 3-methylthio-5-ethylthio-2,4-diaminotoluene, 3,5-di(methylthio)-2,6-diaminotoluene, 4,4'-diamino-3,3',5,5'-tetra(methylthio)biphenyl, 4,4'-ethylidenebis[2,6-di(methylthio)aniline], 4,4'-methylenebis[2,6-di(ethylthio)aniline], and diethyltoluene diamine, such as 3,5-diethyl-2,4-diaminotoluene or 3,5-diethyl-2,6-diaminotoluene. Especially preferred is a diethyltoluene diamine, for example, 3,5-diethyl-2,4-diaminotoluene and 3,5-diethyl-2,6-diaminotoluene, or a mixture thereof.

The at least one aromatic amine (a) containing at least two amino groups is either commercially available or can be prepared according to processes known per se.

Concrete embodiments of the radicals $R_1$, $R_2$, $R_3$, $R_4$, $R_5$, $R_6$, $R_7$, $R_8$, $R_{10}$, $R_{11}$, $R_{12}$, $R_{13}$, $R_{14}$ and $R_{15}$ of formulae (1) and (2) are given below.

As $C_1$-$C_4$alkyl there come into consideration for $R_1$, $R_2$, $R_3$, $R_4$, $R_5$, $R_6$, $R_7$, $R_8$, $R_{10}$, $R_{11}$, $R_{12}$, $R_{13}$, $R_{14}$ and $R_{15}$ each independently of one another, for example, methyl, ethyl, n-propyl, isopropyl, n-butyl, sec-butyl, tert-butyl or isobutyl. The exemplifications also apply to $C_1$-$C_4$alkyl as an optional substituent of $R_1$, $R_2$, $R_3$, $R_4$, $R_5$, $R_6$, $R_7$, $R_8$, $R_{10}$, and $R_{11}$ in the meaning of substituted phenyl.

As $C_1$-$C_4$alkoxy there come into consideration for $R_1$, $R_2$, $R_3$, $R_4$, $R_5$, $R_6$, $R_7$, $R_8$, $R_{10}$, $R_{11}$, $R_{12}$, $R_{13}$, $R_{14}$ and $R_{15}$ each independently of one another, for example, methoxy, ethoxy, n-propoxy, isopropoxy, n-butoxy or isobutoxy. The exemplifications also apply to $C_1$-$C_4$alkoxy as an optional substituent of $R_1$, $R_2$, $R_3$, $R_4$, $R_5$, $R_6$, $R_7$, $R_8$, $R_{10}$, and $R_{11}$ in the meaning of substituted phenyl.

As halogen there come into consideration for $R_1$, $R_2$, $R_3$, $R_4$, $R_5$, $R_6$, $R_7$, $R_8$, $R_{10}$, $R_{11}$, $R_{12}$, $R_{13}$, $R_{14}$ and $R_{15}$ each independently of one another, for example, bromine, chlorine or fluorine. The exemplifications also apply to halogen as an optional substituent of $R_1$, $R_2$, $R_3$, $R_4$, $R_5$, $R_6$, $R_7$, $R_8$, $R_{10}$, and $R_{11}$ in the meaning of substituted phenyl.

Any tetrakisphenol of formula (1) can be used as the host molecule for the preparation of the clathrate compound (b), for example, 1,1,2,2-tetrakis(4-hydroxyphenyl)ethane, 1,1,2,2-tetrakis(3-methyl-4-hydroxyphenyl)ethane, 1,1,2,2-tetrakis(3,5-dimethyl-4-hydroxyphenyl)ethane, 1,1,2,2-tetrakis(3-chloro-4-hydroxyphenyl)ethane, 1,1,2,2-tetrakis(3,5-dichloro-4-hydroxyphenyl)ethane, 1,1,2,2-tetrakis(3-bromo-4-hydroxyphenyl)ethane, 1,1,2,2-tetrakis(3,5-dibromo-4-hydroxyphenyl)ethane, 1,1,2,2-tetrakis(3-t-butyl-4-hydroxyphenyl)ethane, 1,1,2,2-tetrakis(3,5-di-t-butyl-4-hydroxyphenyl)ethane, 1,1,2,2-tetrakis(3-fluoro-4-hydroxyphenyl)ethane, 1,1,2,2-tetrakis(3,5-difluoro-4-hydroxyphenyl)ethane, 1,1,2,2-tetrakis(3-methoxy-4-hydroxyphenyl)ethane, 1,1,2,2-tetrakis(3,5-dimethoxy-4- hydroxyphenyl)ethane, 1,1,2,2-tetrakis(3-chloro-5-methyl-4-hydroxyphenyl)ethane, 1,1,2,2-tetrakis(3-bromo-5-methyl-4-hydroxyphenyl)ethane, 1,1,2,2-tetrakis(3-methoxy-5-methyl-4-hydroxyphenyl)ethane, 1,1,2,2-tetrakis(3-t-butyl-5-methyl-4-hydroxyphenyl)ethane, 1,1,2,2-tetrakis(3-chloro-5-bromo-4-hydroxyphenyl)ethane, 1,1,2,2-tetrakis(3-chloro-5-phenyl-4-hydroxyphenyl)ethane, 1,1,2,2-tetrakis[(4-hydroxy-3-phenyl)phenyl]ethane, 1,1,3,3-tetrakis(4-hydroxyphenyl)propane, 1,1,3,3-tetrakis(3-methyl-4-hydroxyphenyl)propane, 1,1,3,3-tetrakis(3,5-dimethyl-4-hydroxyphenyl)propane, 1,1,3,3-tetrakis(3-chloro-4-hydroxyphenyl)propane, 1,1,3,3-tetrakis(3,5-dichloro-4-hydroxyphenyl)propane, 1,1,3,3-tetrakis(3-bromo-4-hydroxyphenyl)propane, 1,1,3,3-tetrakis(3,5-dibromo-4-hydroxyphenyl)propane, 1,1,3,3-tetrakis(3-phenyl-4-hydroxyphenyl)propane, 1,1,3,3-tetrakis(3,5-diphenyl-4-hydroxyphenyl)propane, 1,1,3,3-tetrakis(3-methoxy-4-hydroxyphenyl)propane, 1,1,3,3-tetrakis(3,5-dimethoxy-4-hydroxyphenyl)propane, 1,1,3,3-tetrakis(3-t-butyl-4-hydroxyphenyl)propane, 1,1,3,3-tetrakis(3,5-di-t-butyl-4-hydroxyphenyl)propane, 1,1,4,4-tetrakis(4-hydroxyphenyl)butane, 1,1,4,4-tetrakis(3-methyl-4-hydroxyphenyl)butane, 1,1,4,4-tetrakis(3,5-dimethyl-4-hydroxyphenyl)butane, 1,1,4,4-tetrakis(3-chloro-4-hydroxyphenyl)butane, 1,1,4,4-tetrakis(3,5-dichloro-4-hydroxyphenyl)butane, 1,1,4,4-tetrakis(3-methoxy-4-hydroxyphenyl)butane, 1,1,4,4-tetrakis(3,5-dimethoxy-4-hydroxyphenyl)butane, 1,1,4,4-tetrakis(3-bromo-4-hydroxyphenyl)butane, 1,1,4,4-tetrakis(3,5-dibromo-4-hydroxyphenyl)butane, 1,1,4,4-tetrakis(3-t-butyl-4-hydroxyphenyl)butane or 1,1,4,4-tetrakis(3,5-di-t-butyl-4-hydroxyphenyl)butane and the like. These tetrakis phenol compounds can be used in either form of single or a combination of two or more. In a certain embodiment the tetrakis phenol compound is 1,1,2,2-tetrakis(4-hydroxyphenyl)ethane, 1,1,2,2-tetrakis(3-methyl-4-hydroxyphenyl)ethane, 1,1,2,2-tetrakis(3,5-dimethyl-4-hydroxyphenyl)ethane or 1,1,2,2-tetrakis(3-chloro-4-hydroxyphenyl)ethane.

Preferably, n in formula (1) is the number 0 or 1, especially the number 0.

Any 9,9-Bis(4-hydroxyphenyl)fluorene of formula (2) can be used as the host molecule for the preparation of the clathrate compound (b), for example, 9,9-Bis(4-hydroxyphenyl)fluorene or derivatives thereof as specified in formula (2).

Imidazole or imidazolium derivatives which may come into consideration as the guest molecule for the preparation of the clathrate compound (b) are, for example, imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4-methyl-5-hydroxymethylimidazole, 2-phenylimidazole, 2-phenyl-4,5-dihydroxymethylimidazole, 1,2-phenyl-4-methyl-5-hydroxymethylimidazole, 1-dodecyl-2-methylimidazole, 1-cyanoethyl-2-phenyl-4,5-di(2-cyanoethoxy)methylimidazole, 1-butyl-3-methylimidazolium chloride, 1-dodecyl-2-methyl-3-benzylimidazolium chloride, 1,3-dimethylimidazolium chloride, 1-benzyl-2-phenylimidazole hydrochloride and 1-benzyl-2-phenylimidazolium trimellitate.

Suitable salts of imidazole derivatives which may come into consideration are, for example, hydrochloric acid-, sulfonic acid-, carboxylic acid-, hexafluoroantimonic acid-salts.

In a certain embodiment of the present invention the guest molecule of the clathrate compound (b) is an imidazole derivative of the formula

(4)

wherein $R_{16}$ is hydrogen, $C_1$-$C_{20}$alkyl, benzyl, cyanoethyl, or phenyl which is unsubstituted or substituted by $C_1$-$C_4$alkyl, $C_1$-$C_4$alkoxy or halogen, and $R_{17}$ is hydrogen, $C_1$-$C_{20}$alkyl, or phenyl which is unsubstituted or substituted by $C_1$-$C_4$alkyl, $C_1$-$C_4$alkoxy or halogen, $R_{18}$ and $R_{19}$ are each independently of one another hydrogen; halogen; phenyl which is unsubstituted or substituted by $C_1$-$C_4$alkyl, $C_1$-$C_4$alkoxy or halogen; $C_1$-$C_4$alkyl which is unsubstituted or substituted by hydroxy, halogen, $C_1$-$C_4$alkoxy, or cyano substituted $C_1$-$C_4$alkoxy.

The concrete embodiments listed above for $R_1$, $R_2$, $R_3$, $R_4$, $R_5$, $R_6$, $R_7$, $R_8$, $R_{10}$, $R_{11}$, $R_{12}$, $R_{13}$, $R_{14}$ and $R_{15}$ also apply to $C_1$-$C_4$alkyl, $C_1$-$C_4$alkoxy or halogen as optional substituents of $R_{16}$, $R_{17}$, $R_{18}$ and $R_{19}$ in the meaning of substituted phenyl.

As $C_1$-$C_{20}$alkyl there come into consideration for $R_{16}$ and $R_{17}$ each independently of one another, for example, methyl, ethyl, n-propyl, isopropyl, n-butyl, sec-butyl, tert-butyl, isobutyl, n-pentyl, isopentyl, neopentyl, n-hexyl, n-heptyl, n-octyl, n-nonyl, n-decyl, n-undecyl, n-dodecyl, n-pentadecyl, n-hexadecyl or n-heptadecyl.

As $C_1$-$C_4$alkyl there come into consideration for $R_{18}$ and $R_{19}$ each independently of one another, for example, methyl, ethyl, n-propyl, isopropyl, n-butyl, sec-butyl, tert-butyl or isobutyl, each of which may be unsubstituted or substituted by hydroxy, halogen, such as bromine or chlorine, or $C_1$-$C_4$alkoxy, which in turn may be substituted by cyano.

As halogen there come into consideration for $R_{18}$ and $R_{19}$ each independently of one another, for example, bromine or chlorine.

Preferred as the guest molecule for the preparation of the clathrate compound (b) is an imidazole derivative, for example, imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4-methyl-5-hydroxymethylimidazole, 2-phenylimidazole, 2-phenyl-4,5-dihydroxymethylimidazole, 1,2-phenyl-4-methyl-5-hydroxymethylimidazole, 1-dodecyl-2-methylimidazole or 1-cyanoethyl-2-phenyl-4,5-di(2-cyanoethoxy)methylimidazole, especially, 2-methylimidazole, 2-ethylimidazole, 2-isopropylimidazole, 2-ethyl-4-methylimidazole, 1-isopropyl-2-methylimidazole, 2-phenylimidazole, or 1-benzyl-2-methylimidazole, or mixtures thereof. In a particular embodiment of the present invention 2-ethyl-4-methylimidazole, 2-phenyl-4-methyl-5-hydroxymethylimidazole or 2-methylimidazole, especially 2-ethyl-4-methylimidazole is used.

In a preferred embodiment, the at least one clathrate compound (b) is obtained by reacting a tetrakisphenol of the formula (1) as the host molecule and an imidazole or an imidazolium derivative as the guest molecule, wherein the definitions and preferences given above apply.

The curing agent according to the present invention can advantageously be used for the curing of epoxy resins, for example, in potting or encapsulation applications for manufacturing of electrical insulation systems.

Accordingly, the present invention also relates to a multiple component thermosetting epoxy resin composition comprising
(A) at least one epoxy resin, and
(B) at least one curing agent, comprising
(a) at least one aromatic amine containing at least two amino groups, and
(b) at least one clathrate compound obtained by reacting a tetrakisphenol of the formula

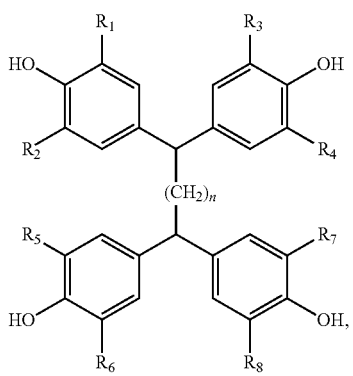

(1)

or
a 9,9-Bis(4-hydroxyphenyl)fluorene of formula

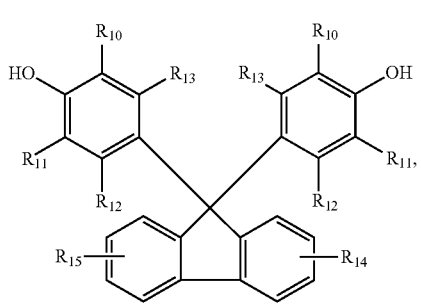

(2)

as the host molecule and an imidazole or an imidazolium derivative as the guest molecule, wherein,
$R_1$, $R_2$, $R_3$, $R_4$, $R_5$, $R_6$, $R_7$, $R_8$, $R_{10}$, and $R_{11}$ are each independently of one another hydrogen, halogen, $C_1$-$C_4$alkyl, $C_1$-$C_4$alkoxy, or phenyl which is unsubstituted or substituted by $C_1$-$C_4$alkyl, $C_1$-$C_4$alkoxy or halogen, $R_{12}$, $R_{13}$, $R_{14}$ and $R_{15}$ are each independently of one another hydrogen, halogen,
$C_1$-$C_4$alkyl or $C_1$-$C_4$alkoxy, and
n is the number 0, 1, 2 or 3, wherein the definitions and preferences given above apply.

The at least one epoxy resin (A) is a compound containing at least one glycidyl ether group, preferably more than one glycidyl ether groups, for example, two or three glycidyl ether groups. The epoxy resin may be saturated or unsaturated aliphatic, saturated or unsaturated cycloaliphatic, aromatic or heterocyclic and may be substituted. The epoxy resin may also be a monomeric or a polymeric compound. A survey of epoxy resins useful for the use in the present invention can be found, for example, in Lee, H. and Neville, Handbook of Epoxy Resins, McGraw-Hill Book Company, New York (1982).

The epoxy resin (A) may vary and include conventional and commercially available epoxy resins, which may be used alone or in combinations of two or more. In choosing epoxy resins for the compositions according to the present invention, consideration should not only be given to properties of the final product, but also to viscosity and other properties that may influence the processing of the resin composition.

The epoxy resin (A) may have an epoxy equivalent weight of about 160 to about 400, preferably from about 170 to about 250. If the epoxy resin is halogenated, the equivalent weight may be somewhat higher.

If required the epoxy resin (A) contains an epoxy diluent. The epoxy diluent component is, for example, a glycidyl terminated compound. Especially preferred are compounds containing glycidyl or β-methylglycidyl groups directly attached to an atom of oxygen, nitrogen, or sulfur. Such resins include polyglycidyl and poly(β-methylglycidyl) esters obtainable by the reaction of a substance containing two or more carboxylic acid groups per molecule with epichlorohydrin, glycerol dichlorohydrin, or β-methylepichlorohydrin in the presence of alkali. The polyglycidyl esters may be derived from aliphatic carboxylic acids, e.g. oxalic acid, succinic acid, adipic acid, sebacic acid, or dimerised or trimerised linoleic acid, from cycloaliphatic carboxylic acids such as hexahydrophthalic, 4-methylhexahydrophthalic, tetrahydrophthalic, and 4-methyltetrahydrophthalic acid, or from aromatic carboxylic acids, such as phthalic acid, isophthalic acid, and terephthalic acid.

Particularly suitable epoxy resins (A) known to the skilled worker are based on reaction products of polyfunctional alcohols, phenols, cycloaliphatic carboxylic acids, aromatic amines, or aminophenols with epichlorohydrin.

Aliphatic alcohols which come into consideration for reaction with epichlorhydrin to form suitable polyglycidyl ethers are, for example, ethylene glycol and poly(oxyethylene)glycols such as diethylene glycol and triethylene glycol, propylene glycol and poly(oxypropylene)-glycols, propane-1,3-diol, butane-1,4-diol, pentane-1,5-diol, hexane-1,6-diol, hexane-2,4,6-triol, glycerol, 1,1,1-trimethylolpropane, and pentaerythritol.

Cycloaliphatic alcohols which come into consideration for reaction with epichlorhydrin to form suitable polyglycidyl ethers are, for example, 1,4-cyclohexanediol (quinitol), 1,1-bis(hydroxymethyl)cyclohex-3-ene, bis(4-hydroxycyclohexyl)methane, and 2,2-bis(4-hydroxycyclohexyl)-propane.

Alcohols containing aromatic nuclei which come into consideration for reaction with epichlorhydrin to form suitable polyglycidyl ethers are, for example, N,N-bis-(2-hydroxyethyl)aniline and 4,4'-bis(2-hydroxyethylamino)diphenylmethane.

Preferably the polyglycidyl ethers are derived from substances containing two or more phenolic hydroxy groups per molecule, for example, resorcinol, catechol, hydroquinone, bis(4-hydroxyphenyl)methane (bisphenol F), 1,1,2,2-tetrakis(4-hydroxyphenyl)ethane, 4,4'-dihydroxydiphenyl, bis(4-hydroxyphenyl)sulphone (bisphenol S), 1,1-bis(4-hydroxyphenyl)-1-phenyl ethane (bisphenol AP), 1,1-bis(4-hydroxylphenyl)ethylene (bisphenol AD), phenol-formaldehyde or cresol-formaldehyde novolac resins, 2,2-bis(4-hydroxyphenyl)propane (bisphenol A), and 2,2-bis(3,5-dibromo-4-hydroxyphenyl)propane, especially 2,2-bis(4-hydroxyphenyl)propane (bisphenol A).

In a particular embodiment, the at least one epoxy resin (A) is a diglycidylether of bisphenol A having an epoxy equivalent weight of about 180 to about 190.

Another few non-limiting embodiments include, for example, triglycidyl ethers of para-aminophenols. It is also possible to use a mixture of two or more epoxy resins.

The at least one epoxy resin component (A) is either commercially available or can be prepared according to processes known per se. Commercially available products are, for example, D.E.R. 330, D.E.R. 331, D.E.R. 332, D.E.R. 334, D.E.R. 354, D.E.R. 580, D.E.N. 431, D.E.N. 438, D.E.R. 736, or D.E.R. 732 available from The Dow Chemical Company, or ARALDITE® MY 740 or ARALDITE® CY 228 from Huntsman Corporation.

The amount of epoxy resin (A) in the final composition can vary in wide ranges and is dependent on the use of the composition. In case the composition is used for the preparation of insulation systems for electrical engineering, the amount of epoxy resin (A) is, for example, of from 40 weight percent (wt %) to 98 wt %, based on the total weight of components (A) and (B) in the composition. In another embodiment, the amount of the epoxy resin (A) is, for example, of from 50 wt % to 90 wt %, based on the total weight of the components (A) and (B).

In a certain embodiment 0.5 to 1.2 equivalents of the at least one aromatic amine containing at least two amino groups (a) of the curing agent (B) are applied per equivalent of the epoxy resin (A). In this certain embodiment 0.1 to 10 parts by weight, preferably 1 to 5 parts by weight, of the at least one clathrate compound (b) of the curing agent (B) are applied per 100 parts by weight of epoxy resin (A).

The curing agent (B) may be applied alone, or alternatively, in combination with one or more other suitable curing agents known in the art for the curing of epoxy resins, for example, primary or secondary amines, polyetheramines, acids, lewis acids, lewis bases and phenols. The identity of many of these curing agents and their curing mechanisms are discussed in Lee and Neville, Handbook of Epoxy Resins, McGraw-Hill (1982). Preferably, the curing agent (B) is applied alone.

The total amount of curing agent (B) in the final composition can vary in wide ranges and is dependent on the use of the composition. In case the composition is used for the preparation of insulation systems for electrical engineering, the total amount of curing agent (B) in the final composition is, for example, of from 2 weight percent (wt %) to 60 wt %, based on total weight of components (A) and (B) in the composition. In another embodiment, the total amount of curing agent (B) is, for example, of from 10 wt % to 50 wt %, based on the total weight of the components (A) and (B).

In one embodiment, the present invention relates to a multiple component thermosetting epoxy resin composition comprising (A) 90 to 110 parts by weight, preferably 100 parts by weight, of a diglycidylether of bisphenol A having an epoxy equivalent weight of about 180 to about 190, and (B) a curing agent, consisting of
  (a) 18 to 26 parts by weight, preferably 20 to 24 parts by weight, of diethyltoluene diamine, and
  (b) 1 to 5 parts by weight, preferably 2 to 4 parts by weight, of a clathrate compound obtained by reacting 1,1,2,2-tetrakis(4 hydroxyphenyl)ethane as the host molecule and 2-ethyl-4-methylimidazole as the guest molecule.

The multiple component thermosetting epoxy resin composition according to the present invention may contain at least one filler (C) generally used in insulation systems, which are selected from the group consisting of metal powder, wood flour, glass powder, glass beads, semi-metal oxides, metal oxides, metal hydroxides, semi-metal and metal nitrides, semi-metal and metal carbides, metal carbonates, metal sulfates, and natural or synthetic minerals.

A preferred filler (C) is selected from the group consisting of quartz sand, quartz powder, silica, aluminium oxide, titanium oxide, zirconium oxide, $Mg(OH)_2$, $Al(OH)_3$, dolomite [$CaMg (CO_3)_2$], $Al(OH)_3$, $AlO(OH)$, silicon nitride, boron nitrides, aluminium nitride, silicon carbide, boron carbides, dolomite, chalk, calcium carbonate, barite, gypsum, hydromagnesite, zeolites, talcum, mica, kaolin and wollastonite. Especially preferred is quarz, silica, wollastonite or calcium carbonate.

The filler material may optionally be coated, for example, with a silane or a siloxane known in the art for coating of filler materials, either before the filler is added to the epoxy resin composition, or alternatively, by adding the filler and the coating material to the epoxy resin composition, whereupon the coated filler is formed in the composition.

The amount of filler (C) in the final composition can vary in wide ranges and is dependent on the use of the composition. In case the composition is used for the preparation of insulation systems for electrical engineering, the amount of filler (C) is, for example, of from 30 weight percent (wt %) to 75 wt %, based on the total weight of the thermosetting epoxy resin composition. In one embodiment, the amount of filler (C) is, for example, of from 40 wt % to 75 wt %, based on the total weight of the thermosetting epoxy resin composition. In another embodiment, the amount of filler (C) is, for example, of from 50 wt % to 70 wt %, based on the total weight of the thermosetting epoxy resin composition.

Further additives may be selected from processing aids to improve the rheological properties of the liquid mix resin, hydrophobic compounds including silicones, wetting/dispersing agents, plasticizers, reactive or non-reactive diluents, flexibilizers, accelerators, antioxidants, light absorbers, pigments, flame retardants, fibers and other additives generally used in electrical applications. These additives are known to the person skilled in the art.

In case the composition is used for the preparation of cured articles other than insulation systems for electrical engineering, for example, the preparation of composite articles or coatings for air core reactors, filler (C) may be omitted.

The epoxy resin composition according to the present invention is R42-free and SVHC-free, and distinguished by a long pot life and a high reactivity at elevated processing temperatures.

The epoxy resin composition according to the present invention can advantageously be used for the manufacturing of insulation systems for electrical engineering, for example, encased articles obtained from casting, potting, encapsulation, and impregnation processes, such as gravity casting, vacuum casting, automatic pressure gelation (APG), vacuum pressure gelation (VPG), filament winding, pultrusion and infusion, which exhibit good mechanical, electrical and dielectrical properties, for example, insulators, bushings, switchgears and instrument transformers, or dry type distribution transformers, hollow core insulators, or composite insulators.

The inventive composition can also be used as adhesive, or for the manufacturing of other cured articles, for example, composite articles, such as water pipes and water containers, or coatings for air core reactors via trickle impregnation or vacuum pressure impregnation (VPI).

Accordingly, the present invention furthermore relates to a process for the preparation of cured articles, wherein a multiple component thermosetting epoxy resin composition is used, said epoxy resin composition comprising
(A) at least one epoxy resin, and
(B) at least one curing agent, comprising
  (a) at least one aromatic amine containing at least two amino groups, and
  (b) at least one clathrate compound obtained by reacting a tetrakisphenol of the abovementioned formula (1), or a 9,9-Bis(4-hydroxyphenyl)fluorene of the abovementioned formula (2) as the host molecule and an imidazole or an imidazolium derivative as the guest molecule, wherein the definitions and preferences given above apply.

In one embodiment the cured articles are, for example, insulation systems for electrical engineering which are prepared by casting, potting, encapsulation and impregnation processes, such as gravity casting, vacuum casting, automatic pressure gelation (APG), vacuum pressure gelation (VPG), infusion, and the like.

Accordingly, the present invention also relates to a process for the preparation of an insulation system for electrical engineering by a casting, potting, encapsulation, or an impregnation process, wherein a multiple component thermosetting epoxy resin composition is used, said epoxy resin composition comprising
(A) at least one epoxy resin, and
(B) at least one curing agent, comprising
  (a) at least one aromatic amine containing at least two amino groups, and
  (b) at least one clathrate compound obtained by reacting a tetrakisphenol of the formula

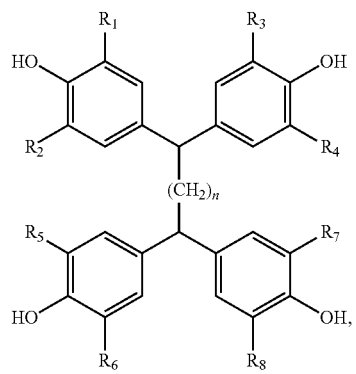

(1)

a 9,9-Bis(4-hydroxyphenyl)fluorene of formula

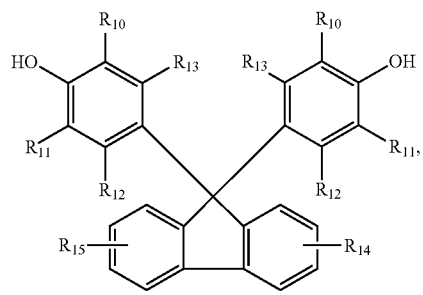

(2)

or an isophthalic acid of the formula

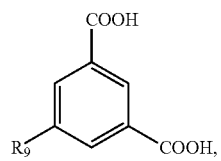

(3)

as the host molecule and an imidazole or an imidazolium derivative as the guest molecule, wherein, $R_1$, $R_2$, $R_3$, $R_4$, $R_5$, $R_6$, $R_7$, $R_8$, $R_{10}$, and $R_{11}$ are each independently of one another hydrogen, halogen, $C_1$-$C_4$alkyl, $C_1$-$C_4$alkoxy, or phenyl which is unsubstituted or substituted by $C_1$-$C_4$alkyl, $C_1$-$C_4$alkoxy or halogen, $R_9$ is $C_1$-$C_6$alkyl, $C_1$-$C_6$alkoxy, nitro or hydroxyl, $R_{12}$, $R_{13}$, $R_{14}$ and $R_{15}$ are each independently of one another hydrogen, halogen, $C_1$-$C_4$alkyl or $C_1$-$C_4$alkoxy, and n is the number 0, 1, 2 or 3, wherein the definitions and preferences given above apply.

As $C_1$-$C_6$alkyl there come into consideration for $R_9$, for example, methyl, ethyl, n-propyl, isopropyl, n-butyl, sec-butyl, tert-butyl, isobutyl, n-pentyl, iso-pentyl or n-hexyl.

As $C_1$-$C_6$alkoxy there come into consideration for $R_9$, for example, methoxy, ethoxy, n-propoxy, isopropoxy, n-butoxy, isobutoxy, n-pentyloxy, iso-pentyloxy or n-hexyloxy.

Any isophthalic acid of formula (3) can be used as the host molecule for the preparation of the clathrate compound (b), for example, 5-tert-butylisophthalic acid, 5-hydroxyisophthalic acid, 5-methoxyisophthalic or 5-nitroisophthalic acid, preferably 5-tert-butylisophthalic acid, 5-hydroxyisophthalic acid or 5-nitroisophthalic acid, and especially 5-hydroxyisophthalic acid.

The at least one clathrate compound (b) is commercially available and and/or can be prepared according to processes known per se. Such processes are described, for example, in U.S. Pat. Nos. 5,364,977, 6,727,325, JP-A-2012232994, JP-A-2007039449 and CN-A-102875470. Commercially available products are, for example, TEP-2E4MHZ of Nippon Soda, a clathrate compound prepared from 1,1,2,2-tetrakis(4-hydroxyphenyl)ethane and 2-ethyl-4-methylimidazole; HIPA-2P4MHZ of Nippon Soda, a clathrate compound prepared from 5-hydroxyisophthalic acid and 2-phenyl-4-methyl-5-hydroxymethylimidazole; HIPA-2E4MHZ of Nippon Soda, a clathrate compound prepared from 5-hydroxyisophthalic acid and and 2-ethyl-4-methylimidazole; and AN-110 of Nippon Soda, a clathrate compound prepared from 9,9-Bis(4-hydroxyphenyl)fluorene and and 2-ethyl-4-methylimidazole.

APG allows for the preparation of a casting product made of an epoxy resin in a short period of time by hardening and forming the epoxy resin. In general, an APG apparatus to carry out the APG process includes a pair of molds (hereafter called mold), a resin mixing and degassing tank connected to the mold through a pipe, and an opening and closing system for opening and closing the mold.

In a typical APG process, a metal conductor or an insert, which is pre-heated and dried, is placed into the mold located in a vacuum chamber. After closing of the mold by an opening and closing system, the epoxy resin composition is injected into the mold from an inlet located at the bottom of the mold by applying pressure to the resin mixing tank. Before injection, the resin composition is normally held at a moderate temperature of 40 to 60° C. to ensure an appropriate pot life (usable time of the epoxy resin), while the temperature of the mold is kept at around 120° C. or above to obtain the casting products within a reasonably short time. After injection of the epoxy resin composition into the hot mold, the resin composition cures while the pressure applied to the epoxy resin in the resin mixing tank is kept at about 0.1 to 0.5 MPa.

Large casting products made of more than 10 kg of resin may be produced conveniently by the APG process within a short time, for example, of from 20 to 60 minutes. Normally, the casting product released from the mold is post cured in a separate curing oven to complete the reaction of the epoxy resin.

In one embodiment of the inventive process, the said cured articles are insulation systems for electrical engineering, which are prepared by casting, potting, encapsulation, and impregnation processes, for example, gravity casting, vacuum casting, automatic pressure gelation (APG), vacuum pressure gelation (VPG), filament winding, pultrusion and infusion.

In another embodiment of the inventive process, the cured articles are composite articles, such as water pipes and water containers, or coatings for air core reactors.

In a preferred embodiment, the insulation systems for electrical engineering are prepared by automatic pressure gelation (APG), or vacuum casting, especially by automatic pressure gelation (APG).

The epoxy resin compositions according to the present invention are, in particular, distinguished by a long pot life and a high reactivity at elevated processing temperatures. The properties are similar to the properties of known epoxy compositions based on respiratory sensitizing anhydride cure, which are mainly used for the preparation of insulation systems for electrical engineering. Therefore, the inventive compositions are suitable to replace the compositions of the prior art in these applications. Moreover, in casting applications, a lower exothermic peak temperature allows to control the cure profile, i.e. gelation front within the mold, as known for epoxy resin compositions based on anhydride cure.

The present invention finally refers to the cured articles obtained by the process according to the present invention. The glass transition temperature of the cured article is in the same range as for known high temperature cure anhydride based thermosetting epoxy resin compositions, for example, in the range of from 70° C. to 150° C. The tensile strength of the cured article is 70 MPa or higher.

In particular the articles prepared in accordance with the inventive process are used in medium and high voltage switchgear applications, as medium and high voltage instrument transformers, as post insulators, and as bushings and transformers.

EXAMPLES OF THE INVENTION

The following Examples serve to illustrate the invention. Unless otherwise indicated, the temperatures are given in degrees Celsius, parts are parts by weight and percentages relate to % by weight. Parts by weight relate to parts by volume in a ratio of kilograms to litres.

Description of Ingredients

ARALDITE® MY 740: bisphenol-A diglycidylether epoxy resin with an epoxy equivalent of 180-190 g/eq. Supplier: Huntsman.

DETDA: diethyltoluene diamine. Supplier: Lonza.

Accelerator DY 9577: boron trichloride octyldimethylamine complex. Supplier: Huntsman.

ARADUR® HZ 5933: solution of boron trifluoride isophorondiamine complex in methanol. Supplier: Huntsman. Before use, the dry crystalline boron trifluoride isophorondiamine complex is isolated from its solution by evaporation of methanol at 50° C. under vacuum.

2,4-EMI: 2-ethyl-4-methylimidazole. Supplier: BASF.

ARALDITE® CY 228: modified bisphenol A diglycidylether epoxy resin with an epoxy equivalent of 188-200 g/eq. Supplier: Huntsman.

ARADUR® HY 918-1: Anhydride hardener consisting of various isomers of methyltetrahydrophtalic anhydride. Supplier: Huntsman.

Accelerator DY 062: tertiary amine, catalyst. Supplier: Huntsman.

W12 (filler): silica flour flower with an average particle size of 16 micron. Supplier: Quarzwerke.

TEP-2E4MHZ: clathrate prepared from 1,1,2,2-tetrakis (4-hydroxyphenyl) ethane as host molecule and 2-ethyl-4-methylimidazole as guest molecule. Supplier: Nippon Soda Japan.

Example 1a 3.0 g of TEP-2E4MHZ are dispersed in 100.0 g of ARALDITE® MY 740 at room temperature within 5 minutes by means of a disperser stirrer. 23.8 g of DETDA are added at room temperature to the dispersion obtained within 2 minutes under stirring with a blade agitator.

Example 1b 3.0 g of TEP-2E4MHZ are dispersed in 100.0 g of ARALDITE® MY 740 at room temperature within 5 minutes by means of a disperser stirrer. 23.8 g of DETDA are added at room temperature to the dispersion obtained within 2 minutes under stirring with a blade agitator. Upon addition of 190.2 g of W12 to the composition, mixing is continued for 5 minutes. The mixture is slightly heated to 60° C. to facilitate filling of the gel norm tube.

Example 2b 3.0 g of TEP-2E4MHZ are dispersed in 100.0 g of ARALDITE® MY 740 at room temperature within 5 minutes by means of a disperser stirrer. 20 g of DETDA are added at room temperature to the dispersion obtained within 2 minutes under stirring with a blade agitator. Upon addition of 184.5 g of W12 to the composition, mixing is continued for 5 minutes. The mixture is slightly heated to 60° C. to facilitate filling of the gel norm tube.

Comparative Example 1a 100.0 g of ARALDITE® MY 740 and 23.8 g of DETDA are mixed at room temperature within 5 minutes under stirring with a blade agitator.

Comparative Example 2a 100.0 g of ARALDITE® MY 740, 23.8 g of DETDA and 1.0 g of 2,4-EMI are mixed at room temperature within 5 minutes under stirring with a blade agitator.

Comparative Example 3a 1.0 g of isolated boron trifluoride isophorondiamine complex, isolated from ARADUR® HZ 5933, is dispersed in 100.0 g of ARALDITE® MY 740 at room temperature within 5 minutes by means of a disperser stirrer. 23.8 g of DETDA are added at room temperature to the dispersion obtained within 2 minutes under stirring with a blade agitator.

Comparative Example 4a

Accelerator DY 9577 is heated in an oven at 40° C. for 30 min. Subsequently, 100.0 g of ARALDITE® MY 740, 23.8 g of DETDA and 1.0 g of heated accelerator DY 9577 are mixed at room temperature within 5 minutes under stirring with a blade agitator.

Comparative Example 1b 100.0 g of ARALDITE® MY 740 and 23.8 g of DETDA are mixed at room temperature within 2 minutes under stirring with a blade agitator. 186.0 g of W12 are added to the mixture obtained and mixing is continued for 5 minutes. The reactive mixture is slightly heated to 60° C. to facilitate filling of the gel norm tube.

Comparative Example 2b 100.0 g of ARALDITE® MY 740, 23.8 g of DETDA and 1.0 g of 2,4-EMI are mixed at room within 2 minutes under stirring with a blade agitator. 187.2 g of W12 are added to the mixture obtained and mixing is continued for 5 minutes.

Comparative Example 3b 1.0 g of isolated boron trifluoride isophorondiamine complex, isolated from ARADUR® HZ 5933, is dispersed in 100.0 g of ARALDITE® MY 740 at room temperature within 5 minutes by means of a disperser stirrer. 23.8 g of DETDA are added at room temperature to the dispersion obtained within 2 minutes under stirring with a blade agitator. Upon addition of 187.2 g of W12 to the composition, mixing is continued for 5 minutes. The mixture is slightly heated to 60° C. to facilitate filling of the gel norm tube.

Comparative Example 4b

Accelerator DY 9577 is heated in an oven at 40° C. for 30 min. Subsequently, 100.0 g of ARALDITE® MY 740, 23.8 g of DETDA and 1.0 g of heated accelerator DY 9577 are mixed at room temperature within 5 minutes under stirring with a blade agitator. Upon addition of 187.2 g of W12 to the composition, mixing is continued for 5 minutes. The reactive mixture is slightly heated to 60° C. to facilitate filling of the gel norm tube.

Comparative Example 5b 100.0 g of ARALDITE® CY 228, 85.0 g of ARADUR® HY 918-1 and 0.8 g of accelerator DY 062 are mixed at room temperature within 5 minutes under stirring with a blade agitator. 279.0 g of W12 are added to the mixture obtained and mixing is continued for 5 minutes. The reactive mixture is slightly heated to 60° C. to facilitate filling of the gel norm tube.

The gel times of the reactive mixtures obtained in accordance with the Examples and Comparative Examples above are determined with a gel norm/gel timer at 80° C. and 140° C. according to the ISO 9396.

TABLE 1

Test data of unfilled compositions

| | Example | | | | |
|---|---|---|---|---|---|
| | Comp Ex 1a | Comp Ex 2a | Comp Ex 3a | Comp Ex 4a | Ex 1a |
| Gel time at 80° C.[1] [min] | 358 | 90 | 84 | 353 | 134 |
| Gel time at 140° C.[1] [min] | 33 | 10.5 | 4.1 | 28.5 | 6.7 |
| $E_a$[9] [kJ/mol] | 48.1 | 43.4 | 61.0 | 50.8 | 60.5 |

[1] ISO 9396; Gel norm method

TABLE 2

Test data of filled compositions

| | Example | | | | | | |
|---|---|---|---|---|---|---|---|
| | Comp Ex 1b | Comp Ex 2b | Comp Ex 3b | Comp Ex 4b | Comp Ex 5b | Ex 1b | Ex 2b |
| Gel time at 80° C.[1] [min] | 243 | 92.5 | 131 | 272 | 120 | 142 | 151 |
| Gel time at 140° C.[1] [min] | 33 | 11.2 | 15 | 31.3 | 5 | 6.7 | 5.7 |
| $E_a$ [kJ/mol] | 40.3 | 42.6 | 43.8 | 43.7 | 64.2 | 61.7 | 66.2 |
| $T_g$[2] [° C.] $1^{st}/2^{nd}$ run | | | | | 107/111 | 98/105 | 111/116 |

TABLE 2-continued

Test data of filled compositions

| | Example | | | | | | |
|---|---|---|---|---|---|---|---|
| | Comp Ex 1b | Comp Ex 2b | Comp Ex 3b | Comp Ex 4b | Comp Ex 5b | Ex 1b | Ex 2b |
| Tensile Strength[3] [MPa] | | | | | 76 | 81 | 79 |
| Elongation at Break[3] [%] | | | | | 0.93 | 1.02 | 1.1 |
| $K_{1C}$[10] [MPa √m] | | | | | 2.06 | 2.13 | |
| $G_{1C}$[4] [J/m²] | | | | | 374 | 403 | |
| CTE[5] [$10^{-6}$/K] | | | | | 40 | 39 | 40 |
| T [° C.] at 5% weight loss[6] | | | | | 370 | 375 | |
| ☐r at 25° C.[11] | | | | | 3.9 | 4.3 | 4.2 |
| Tracking Resistance[7] | | | | | CTI > 600-<1 mm | CTI > 600-<1 mm | |
| Simulated Crack Temp[8] [° C.] | | | | | 4 | −10 | |

[1] ISO 9396; Gel norm method
[2] Glass transition temperature; IE 1006; Differential Scanning Calorimetry on a Mettler SC 822e (range: 20 to 250° C. at 10° C. min-1)
[3] ISO 527
[4] Fracture Energy; double torsion test (Huntsman proprietary test method)
[5] Coefficient of Thermal Expansion; ISO 11359-2
[6] TGA; Temperature where the weight loss reaches 5%; temperature rise dT/dt = 20 K/min
[7] Comparative Tracking Index; IEC 60112
[8] Simulated Crack Temperature is described in columns 9 and 10 of US-A-6638567, and calculated according to the formula
$RI = -498.08 \cdot Z^{0.18480890} \cdot G^{0.194114601} \cdot (A-18)^{-0.391334273} \cdot T^{-0.58387791} + 224.25$
wherein
RI means Simulated Crack Temperature in ° C.
Z means Elongation at Break in %
G means $G_{1C}$ in J/m²;
A means CTE in $10^{-6}$/K
T means Tg in ° C.
[9] Ea = (ln((gel time at 80° C.)/min)-ln((gel time at 140° C.)/min))/(1/(80° C. + 273° C.)*K/° C.-1/(140° C. + 273° C.)*K/° C.)*831 J/(mol*K)/1000 J/kJ
[10] Kritical stress intensity factor mode I; double torsion test (Huntsman proprietary test method)
[11] IEC 60250

As given in Table 1, the inventive composition of Example 1a exhibits a good pot life, as can be seen from the Gel Time at 80° C., and a high reactivity, as can be seen from the gel time at 140° C., whereas reactivity and pot life of the compositions of Comparative Examples 1a and 2a, respectively, are insufficient.

The composition of Comparative Example 3a according to U.S. Pat. No. 4,775,736 exhibits a high reactivity, but an insufficient pot life, as can be seen from the gel times at 140° C. and 80° C., respectively. The composition of Comparative Example 4a does not satisfy the requirements as to reactivity and pot life.

As given in Table 2 for the compositions containing a filler, the inventive composition of Example 1b exhibits a good pot life, as can be seen from the gel time at 80° C., and a high reactivity, as can be seen from the gel time at 140° C., whereas reactivity and pot life of the compositions of Comparative Examples 1b and 2b, respectively, are insufficient.

The filled composition of Comparative Example 3b according to U.S. Pat. No. 4,775,736 exhibits poor reactivity, whereas the pot life moves into an acceptable range, as can be seen from the gel times at 140° C. and 80° C., respectively. The filled composition of Comparative Example 4b does not satisfy the requirements as to reactivity and the pot life.

The composition of Comparative Example 5b represents a state of the art system showing high reactivity combined with sufficient pot life, as can be seen from the gel times at 140° C. and 80° C. However, the said composition is based on anhydride curing, which nowadays is not desired.

The compositions of Examples 1b and 2b demonstrate that the approach in accordance with the present invention provides thermosetting epoxy compositions which exhibit good pot life at 80° C. and, at the same time, a high reactivity at 140° C., even in the presence of a filler. Advantageously, the inventive compositions are free of the R 42 label and not toxic.

The inventive compositions of Examples 1b and 2b exhibit a similar Tg level as the composition of Comparative Example 5b, and even slightly improved mechanical properties (higher tensile strength, better elongation at break, and slightly higher fracture energy). In summary, the slightly improved mechanical properties add to a significantly improved thermal cycle crack resistance of −10° C. instead of 4° C. as demonstrated by Example 1b.

What is claimed is:

1. A curing agent for thermosetting epoxy resins comprising
   (a) at least one aromatic amine containing at least two amino groups, and (b) at least one clathrate compound obtained by reacting:
9,9-Bis(4-hydroxyphenyl)fluorene of formula

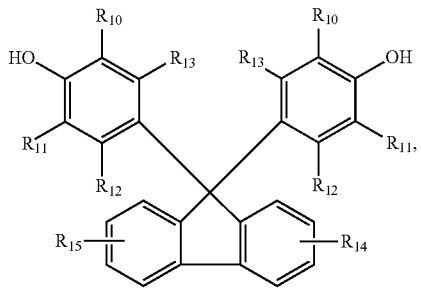
(2)

as the host molecule and an imidazole or an imidazolium derivative as the guest molecule, wherein, $R_{10}$, $R_{11}$, $R_{12}$, $R_{13}$, $R_{14}$ and $R_{15}$ are each hydrogen.

2. The curing agent according to claim 1, wherein the guest molecule of the clathrate compound (b) is selected from the group consisting of imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenyl imidazole, 2-phenyl-4-methyl-5-hydroxymethylimidazole, 2-phenylimidazole, 2-phenyl-4,5-dihydroxymethylimidazole, 1,2-phenyl-4-methyl-5-hydroxymethylimidazole, 1-dodecyl-2-methylimidazole, 1-cyanoethyl-2-phenyl-4,5-di(2-cyanoethoxy)methylimidazole, and mixtures thereof.

3. The curing agent according to claim 1, wherein the guest molecule of the clathrate compound (b) is 2-ethyl-4-methylimidazole or 2-methylimidazole.

4. A process for the preparation of a cured article, wherein a multiple component thermosetting epoxy resin composition according to claim 1 is used.

5. The cured article obtained by the process according to claim 4.

6. The curing agent according to claim 1, wherein the at least one aromatic amine is 3,5-diethyl-2,4-diaminotoluene, 3,5-diethyl-2,6-diaminotoluene, or a mixture thereof.

7. A multiple component thermosetting epoxy resin composition comprising (A) at least one epoxy resin, and (B) at least one curing agent comprising (a) at least one aromatic amine containing at least two amino groups, and (b) at least one clathrate compound obtained by reacting:

9,9-Bis(4-hydroxyphenyl)fluorene of formula

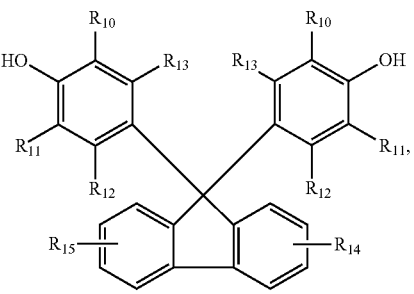
(2)

as the host molecule and an imidazole or an imidazolium derivative as the guest molecule, wherein, $R_{10}$, $R_{11}$, $R_{12}$, $R_{13}$, $R_{14}$ and $R_{15}$ are each hydrogen, wherein the clathrate compound is present in the multiple component thermosetting epoxy resin composition in an amount ranging from 1 to 5 parts by weight based on 100 parts by weight of the at least one epoxy resin.

8. The multiple component thermosetting epoxy resin composition according to claim 7, wherein (A) the epoxy resin comprises a diglycidylether of bisphenol A having an epoxy equivalent weight of about 180 to about 190, and (B) the curing agent consists of (a) 18 to 26 parts by weight of diethyltoluene diamine, and (b) the clathrate compound.

9. The multiple component thermosetting epoxy resin composition according to claim 7, further comprising (C) at least one filler selected from the group consisting of quartz sand, quartz powder, silica, aluminium oxide, titanium oxide, zirconium oxide, $Mg(OH)_2$, $Al(OH)_3$, dolomite [$CaMg(CO_3)_2$], $Al(OH)_3$, $AlO(OH)$, silicon nitride, boron nitrides, aluminium nitride, silicon carbide, boron carbides, dolomite, chalk, calcium carbonate, barite, gypsum, hydromagnesite, zeolites, talcum, mica, kaolin and wollastonite, which may optionally be coated with a silane or a siloxane.

10. A cured article comprising the reaction product of the multiple component thermosetting epoxy resin composition according to claim 7.

11. A process for the preparation of an insulation system for electrical engineering by a casting, potting, encapsulation, or an impregnation process, wherein a multiple component thermosetting epoxy resin composition is used, said epoxy resin composition comprising (A) at least one epoxy resin, and (B) at least one curing agent, comprising (a) at least one aromatic amine containing at least two amino groups, and (b) at least one clathrate compound obtained by reacting:

9,9-Bis(4-hydroxyphenyl)fluorene of formula
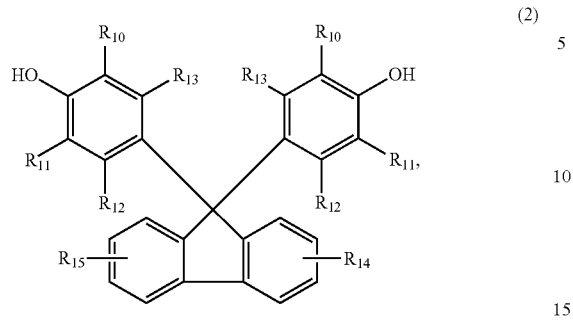
(2)
as the host molecule and an imidazole or an imidazolium derivative as the guest molecule, wherein,
$R_{10}$, $R_{11}$, $R_{12}$, $R_{13}$, $R_{14}$ and $R_{15}$ are each hydrogen.
12. The process according to claim 11, wherein the insulation system for electrical engineering is prepared by automatic pressure gelation (APG).
* * * * *